United States Patent Office 3,485,188
Patented Dec. 23, 1969

3,485,188
QUALITY CONTROLLED PRODUCTION OF DOUGH
Anthony Victor Rollett, Studley, Alexander Steel Smith, Lindfield, Martin Alan Cookson, London, and William Anderson, Tonbridge, England, assignors to British Bakeries Limited, a British company
Filed Aug. 1, 1966, Ser. No. 569,461
Int. Cl. A21c 1/14
U.S. Cl. 107—54                                              2 Claims

ABSTRACT OF THE DISCLOSURE

A method for controlling the consistency of dough, in the manufacture of bread and the like by the mixture of flour and water, by extracting from the dough produced a measurement related to the consistency of the dough, correlating that measurement with a measurement representing a desired value of dough consistency and feeding the correlated information to control the metering of at least one of the ingredients.

---

This invention relates to the production of dough for making bread, morning goods, pastry goods and biscuits.

Dough is produced by mixing flour and water with or without other ingredients and when this is done on a commercial scale either a batch or continuous process may be used. It is desirable for the dough produced to have a constant consistency. For a given type of dough a nominal quantity of water added to a given quantity of flour usually gives an acceptable dough; however, variations occur in the absorption characteristics of flour, and also inaccuracies may occur in the metering of the flour and water, so that the resultant dough may not have similar consistencies in successive batches nor in various periods of the run in a continuous process. At present these inconsistencies may cause sticky doughs, that can have a serious effect on production flow. The inconsistencies may also introduce variability in product quality.

It is the main object of this invention to provide a method of controlling the metering of the ingredients to give continuous optimum consistency in the production of dough.

According to the present invention there is provided, in the production of dough by mixing the ingredients of flour and water with or without other ingredients, a method of controlling the consistency of the dough which includes extracting a measurement which is related to the consistency of the dough and automatically feeding information of this measurement to control the metering of at least one of the ingredients.

The invention also includes apparatus for the production of dough, including means for extracting a measurement which is related to the consistency of the dough, means for storing such extracted measurement, means for automatically comparing the measurement so stored with a datum measurement related to the consistency of the dough and means for controlling the metering of at least one of the ingredients if such comparison shows a deviation.

One method by which dough consistency in batch mixing may be kept constant is by automatic adjustments of water addition through a controlling unit following automatic measurement of mixing time of one batch for a given input of electrical energy. The principle on which the operation of a controlling unit may be based is that for a given input of energy, the mixing time of a dough batch will remain substantially constant unless there is a change in the consistency of the dough. Dough temperature can also affect consistency, but this variation may be obviated by virtue of control of flour and water temperature. Therefore, any change in the consistency of the dough is the result of variation in either (i) the water absorbing capacity of the flour or (ii) a fault in the metering equipment for flour or water.

The controlling unit will measure the time of mixing of each batch of dough in a group of consecutive batches and will retain these times in a memory device. The number of batches in a group of mixings can be varied, according to the conditions of mixing. Once established, the number of batches in the group will normally remain unchanged. When the mixing of each batch is completed, the memory device will discard the time of mixing of the first batch in the group and retain the timing for the most recent batch.

By way of example, the program set for a controller in a given set of conditions may be as follows: The number of batches in the group retained in the memory device may be eight. The permissible variation from an average mixing time of, say approximately one hundred and eighty seconds, may be plus or minus three seconds. The predetermined number of batches in a group which must exceed the permissible variation before water addition is changed may be two. In operation, therefore, if the mixing times of two batches in eight consecutive batches vary from the average mixing time by three seconds or more, the water meter setting will be changed automatically by a given amount.

Alternatively, a standard quantity of water, which will be less than the amount required, may be metered to the mixer for each and every batch. Thereafter a secondary quantity of water will be metered, the actual amount thereof for a particular batch being determined from the average mixing time of a given number of batches immediately preceding. A unit which would carry out this control is described below by way of example only. For ease of description, specific numbers of components and times of mixing are referred to, but it is to be understood that other numbers of components and other mixing times may be used.

In the drawings:

FIG. 5 is a front elevational view, with parts broken away, of a mixer to which the present invention is applicable.

Figure 1:
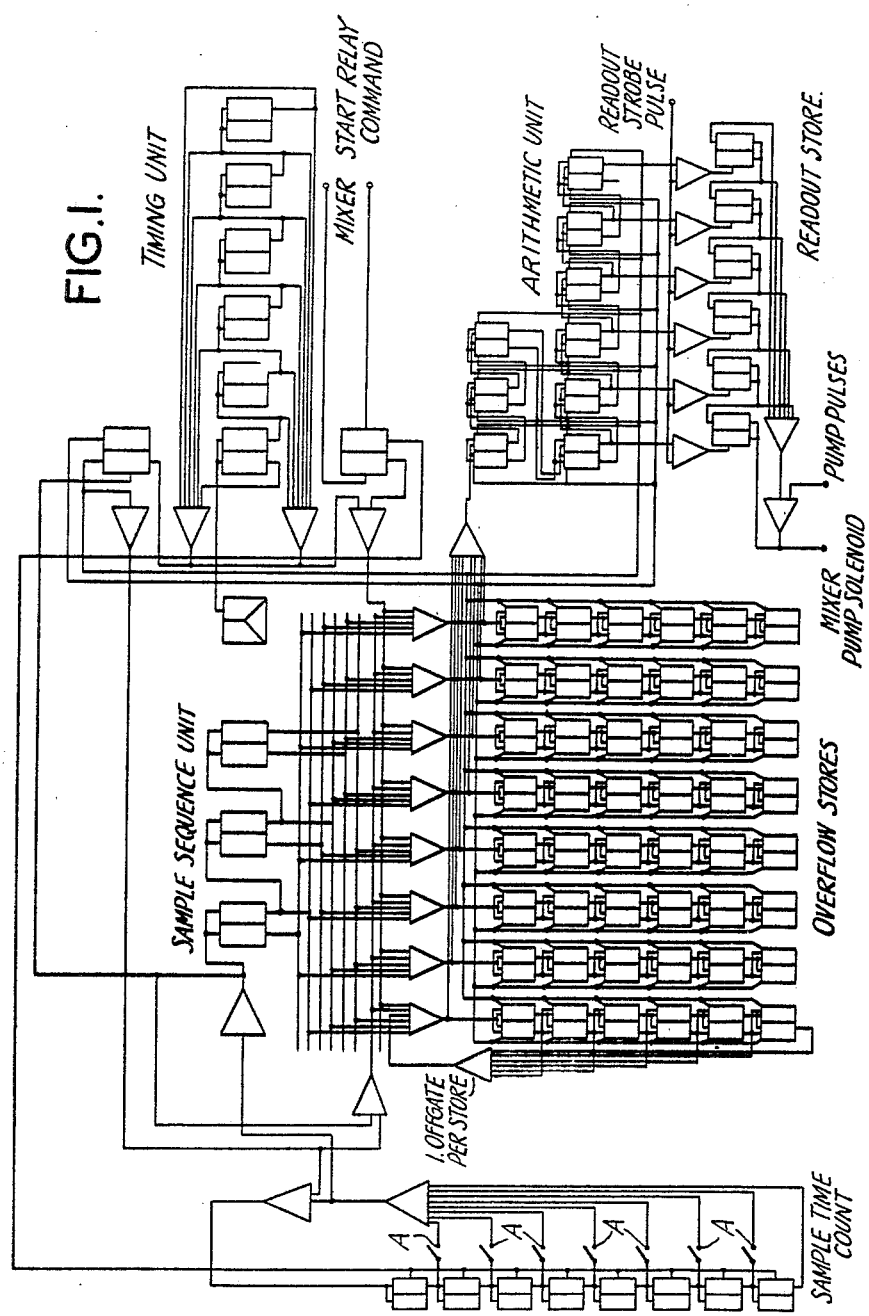
FIG. 1 is a flow diagram of apparatus according to the invention.
Figure 2:
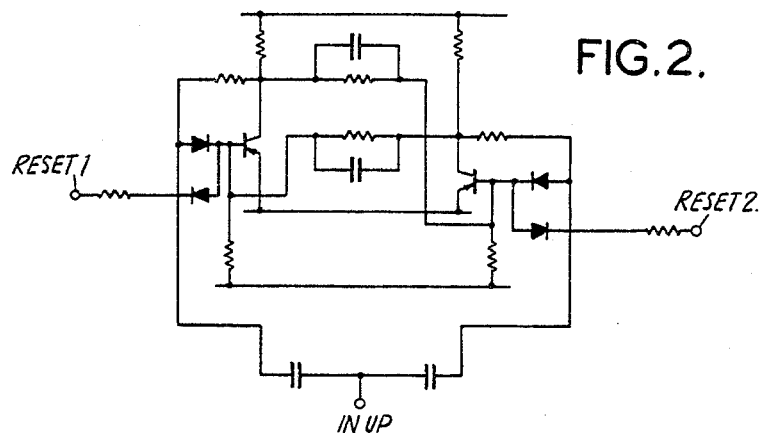
FIG. 2 is a wiring diagram of one of several components of the apparatus of FIG. 1.
Figure 3:
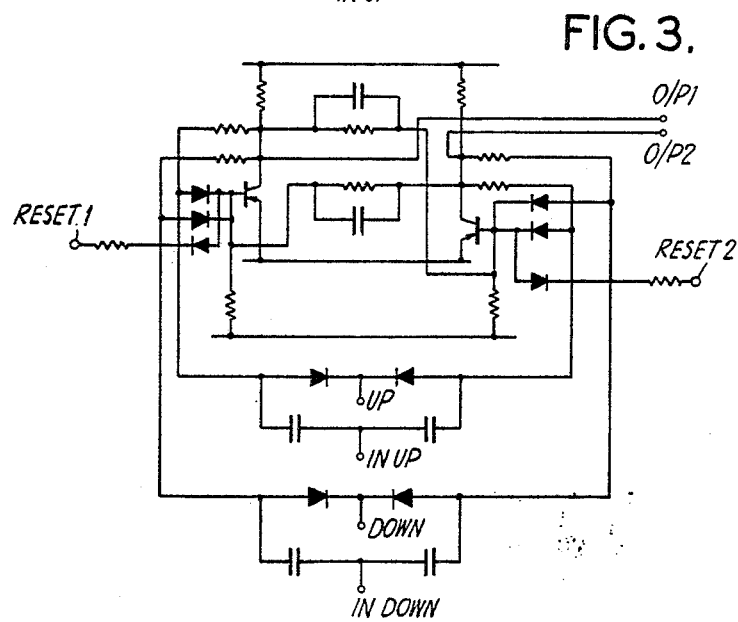
FIG. 3 is a wiring diagram of one of several further components of the apparatus of FIG. 1.

In FIG. 5 there is shown a frame 1 having trunnions 2 and 3 whereby the frame may be rotated about the axis of the trunnions. The frame 1 carries an electrically operated motor 4 which drives, via belting 5, an agitator assembly 6 located in a mixing tank 7 which is fed with the ingredients through the open top 8 of the tank 7. Ingredients for each batch are fed into the tank 7 through open top 8, and the agitator 6 is rotated by motor 4. When mixing is complete the entire frame 1, motor 4 and tank 7 are rotated about trunnions 2 and 3 to discharge the mixed dough.

All logical functions are carried out by means of the basic units named and referred to in FIG. 1, viz, the units described in the following.

TIMING UNIT

This is a chain of six bistable divider circuits connected in cascade such that the output of the preceding one is used to drive the input of the following one. This will give a frequency division of sixty-four, i.e., for sixty-four pulses at the input of the chain, one pulse will appear at the output of the chain. It is convenient to arrange the input pulse frequency to be 64 cycles per second so that the output will be at a frequency of 1 cycle per second.

SAMPLE TIME COUNT

This consists of a chain of eight bistable divider circuits as described in the TIMING UNIT. The output of each drives the following bistable divider and also is connected to the input of a nor gate circuit, via switches A. At the start of the mix each bistable divider is set by means of a high level signal. The output of the TIMING UNIT is also caused to drive the first of the cascaded chain of eight bistable divider circuits. After a number of pulses have driven the bistable divider chain (as determined by the switches) the nor gate connected to the switches has a high level output which stops the output of the TIMING UNIT from driving the first bistable divider circuit.

SAMPLE SEQUENCE UNIT

This is a cascaded chain of three bistable divider-circuits. Connected to the outputs of these are eight nor gate circuits.

These are so connected that for any state of the outputs of the three bistable divider circuits only one nor gate will have a high level output; this will be when all its inputs are at a low level. For a nor gate so selected, any other input which may be applied to it will appear in inverted form at the output, e.g. if such a gate has applied at one of its other inputs a sequence of high and low level signals, they will appear at the output until such time as any other input goes to a high level. Thus any pulses appearing on a common input line to all of the eight gates will appear only on the output of that one which has all its other inputs at low level and only the OVERFLOW STORE connected to the output of that gate will have pulses at its input.

It will thus be seen that any OVERFLOW STORE can be selected and driven by altering the states of the outputs of the three bistable divider circuits.

READOUT STORE

This is a cascaded chain of six bistable dividers, the initial states of the outputs being determined by the output of the nor gates connected to the reset lines.

OVERFLOW STORES

These consist of eight similar cascaded chains of six bistable divider circuits having up/down counting facilities. The inputs to each are selected in turn as described earlier by means of the SAMPLE SEQUENCE UNIT and the corresponding nor gates.

ARITHMETIC UNIT

This is a cascaded chain of nine bistable divider circuits of the type used in the OVERFLOW STORE. The input to the chain is via a nor gate circuit which derives inputs from the OVERFLOW STORE.

The system counts and stores the time taken to complete mixing for a number of dough mixes. As each new mix time is added to the store, the average of that time and the seven previous mixes is taken and used to control the water content for the next mix.

The estimated mixing time is set into the unit at the commencement of a run by means of switches A (FIG. 1), the difference between the estimated and actual times of mix being stored. The equipment is designed so that only positive time differences are stored, thus the time set into the machine initially is the estimated mix time minus a fixed time set into all of the eight OVERFLOW STORES.

Each OVERFLOW STORE is capable of storing time difference of sixty-four seconds, thus at the commencement of a run the machine automatically sets into each OVERFLOW STORE, ARITHMETIC UNIT, and READOUT STORE a time of thirty-two seconds. This will allow, therefore, of subsequent mixing times to vary by ±thirty-two seconds for the predetermined estimated mixing time. Assuming a relationship of one lb. of water for every two seconds deviation from the estimated mixing time, it can be seen that at the commencement of a run on the first mix unit will add sixteen lbs. of water. Assuming an estimated mixing time of one hundred and eighty seconds the time set into the equipment manually will be one hundred and forty-eight seconds.

On applying power to the unit all stores are set as previously described.

On the first mix the mixer draws up a set amount of water, as described, on the completion of which a strobe pulse is generated within the mixer (the means of achieving this is a conventional nature and is dependent in the type of mixer used but could for instance be a pair of contacts opening). This sets into the READOUT STORE the information held in the last six of the chain of bistable dividers of the ARITHMETIC UNIT (which will be 32 seconds on the first mix). At the same instant as the strobe pulse is generated, pumping pulses of a conventional nature are routed through from the mixer (again this could be a relay opening and closing) each opening and closing representing a set amount of water, in this instance, ½ lb. These are passed through a nor gate circuit and appear at the input to the READOUT STORE and are also passed into the mixer to actuate the pump.

The READOUT STORE is caused to count down as a result of the pump pulses until all the information is removed i.e. 32 pulses later. Thus it is seen that a further 32×½ lb. or 16 lbs. of water have been added into the mixing tank. Mixing now commences.

A signal appears from the mixer on the line marked MIXER START RELAY COMMAND (this again is of a conventional nature could be a relay closing) as soon as mixing commences. This causes the SAMPLE TIME COUNT bistable dividers to be reset to an initial state by means of a common reset line, at the same time pulses at 1 second intervals (called T pulses) appear from the TIMING UNIT and enter the input of the first bistable divider in the SAMPLE TIME COUNT. This continues until such time as the inputs to the nor gate connected to the SAMPLE TIME COUNT are all at low level (i.e. after the time set up by the switches).

When this time is reached, one pulse enters the SAMPLE SEQUENCE UNIT driving this on selecting the second chain of OVERFLOW STORES. It is now necessary before the next T pulse is due to remove the information being held in the selected OVERFLOW STORE before new information is allowed to enter the store. As each OVERFLOW STORE is capable of storing a maximum count of 64 seconds it may be necessary to remove 64 counts before the next T pulse is due. For this purpose further pulses (called t pulses) are generated by the TIMING UNIT, 64 of which appear in every T pulse interval.

The selected OVERFLOW STORE is made to operate in the down count mode as is the ARITHMETIC UNIT. The t pulses enter the selected OVERFLOW STORE which counts down until the nor gate which is connected to every bistable divider in the selected OVERFLOW STORE has all its inputs at low level i.e. the store is empty. The same number of t pulses required to empty the OVERFLOW STORE are removed from the ARITHMETIC UNIT.

The selected overflow store is now empty and ready to accept new mixing time information. The next T pulse which occurs after the set time now enters the selected OVERFLOW STORE and ARITHMETIC UNIT.

This continues until the MIXER START RELAY COMMAND signal is removed showing that mixing is completed.

The selected OVERFLOW STORE is now holding a count related to that particular mixing time. As described earlier the mixer has already drawn up a set amount of water, a strobe pulse is generated, the information held in the ARITHMETIC UNIT is transferred into the READOUT STORE and the additional water is added, this time the amount being dependent on the previous mixing time.

It will be remembered that this store has previously been emptied at the beginning of the sequence when pulses from the water measuring apparatus caused the mixer water measuring solenoid to be operated. The transfer from the ARITHMETIC UNIT to the READOUT STORE takes place without destroying the count held in the ARITHMETIC UNIT. Thus, the READOUT STORE now holds the average time of the previous eight mixes which determines the water addition for the next mix.

The whole operation is repeated on subsequent mixes with the exception that the SAMPLE SEQUENCE UNIT causes the next OVERFLOW STORE to be selected which will be the eighth one previous to the mix in operation.

It will thus be appreciated that some device of conventional nature, for example, a wattmeter, be associated with the mixing apparatus to record the energy used in mixing the ingredients. This wattmeter will commence recording when a signal appears at MIXER START RELAY COMMAND and will cease as soon as the preset amount of energy has been recorded. When the preset amount of energy has been used to mix the ingredients the signal will be removed from MIXER START RELAY COMMAND and counting in the OVERFLOW STORE will cease. This count in the OVERFLOW STORE is therefore a measure of the time taken to use the preset amount of energy in mixing the ingredients.

At the relevant time pulses from the water measuring apparatus enter the unit and reappear at the mixer measuring apparatus SOLENOID output, the number of pulses being determined by the number held in the READOUT STORE; this will be sixteen for the first run.

THE MIXER START RELAY COMMAND functions, resetting the bistables of the SAMPLE TIME COUNT.

The TIMING UNIT is now functional giving out one second timing pulses, called T pulses, and within each one second period a further sixty-four pulses, called $t$ pulses, the purpose of these being described later. The T pulses now appear at the input to the SAMPLE TIME COUNT causing the bistable chain to count down. When a number of pulses have entered the chain determined by the switches connected to the chain, a gate is operated causing further T pulses to be diverted to the OVERFLOW STORE and the ARITHMETIC UNIT. In the period between the last T pulse to enter the SAMPLE TIME COUNT and the first to enter the OVERFLOW STORE the $t$ pulses are diverted into the selected OVERFLOW STORE and ARITHMETIC UNIT.

The stores are made to operate in the down count mode and the selected OVERFLOW STORE is made to empty (to hold a count of zero). The number of pulses required to do this will vary depending on the number held in the store but will never be greater than sixty-four. The ARITHMETIC UNIT store is also caused to operate in the down count mode and the number of $t$ pulses required to empty the OVERFLOW STORE is also removed from the ARITHMETIC UNIT store. As soon as the selected OVERFLOW STORE reaches its zero count, the $t$ pulses are removed.

The overflow T pulses now enter the OVERFLOW STORE and ARITHMETIC UNIT store until the mixing is completed.

Thus, the operation so far has been to add a set amount of water at the beginning of the mix, to time the mix, and to cause a new average mixing time to be stored in the ARITHMETIC UNIT.

At the end of the mix, a READOUT STROBE PULSE occurs causing the number held in the ARITHMETIC UNIT to be transferred into the READOUT STORE. It will be remembered that this store has previously been emptied at the beginning of the sequence when pulses from the water measuring apparatus caused the mixer water measuring SOLENOID to be operated. The transfer from the ARITHMETIC UNIT to the READOUT STORE takes place without destroying the count held in the ARITHMETIC UNIT. Thus, the READOUT STORE now holds the average time of the previous eight mixes which determines the water addition for the next mix.

The whole operation is repeated on subsequent mixes with the exception that the SAMPLE SEQUENCE UNIT causes the next OVERFLOW STORE to be selected which will be the eighth one previous to the mix in operation.

Figure 4:
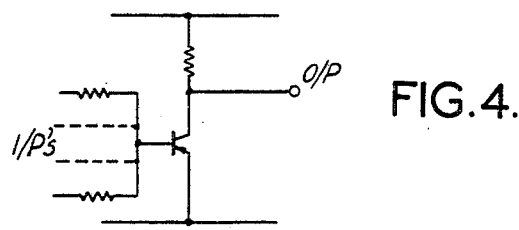
FIG. 4 is a wiring diagram of one of several still further components of the apparatus of FIG. 1.

The units PULSE GENERATOR AMPLIFIER and EMITTER FOLLOWERS are conventional units. The PULSE GENERATOR may be an oscillator with switching means to produce pulses which are fed to the TIMING UNIT the outputs of which are supplied to two NOR gates each of which includes a transistor having an emitter which normally has a low impedance. The EMITTER FOLLOWERS are associated with the NOR gates (FIGURE 4) and perform their normal function in a circuit of this nature. The mixer water measuring solenoid is of conventional construction. Likewise, the water measuring apparatus is conventional, and the average time held in the ARITHMETIC UNIT of the previous mixes is the datum measurement with which the new count is compared.

Alternative methods of achieving the objetcs of the invention are possible within the scope of the invention. For example, the measurement related to the consistency of the dough may be obtained from the means utilised to mix the ingredients, for example, mechanical mixers driven by a shaft are normally employed and the amount of work done by the shaft may be measured. Such measurement may be of torque of drag or of the watts or amperes consumed by the drive motor. Still further, a measure may be taken of the temperature of the dough. Whichever of these or other possible measurements is made, it will be utilised to control a metering device which will be automatically adjusted to give optimum dough consistency.

The method of the invention will improve control of dough variations and its subsequent effects on processing and the quality of the product.

What we claim is:

1. In the production of dough by mixing the ingredients of flour and water with or without other ingredients employing the batch principle of dough production wherein successive batches are prepared, a method of correcting deviations of consistency of the dough from a desired value which includes extracting a measurement which is related to the consistency of the dough and is derived from the time taken to use a preset quantity of energy to mix the dough, comparing the said extracted measurement with a predetermined datum measurement known to relate to the desired value of dough consistency and automatically feeding information of this comparison to control the supply of at least one of the ingredients to a succeeding batch.

2. The method claimed in claim 1, in which measurements related to the consistency of the dough in a given number of successive batches are extracted and these measurements are used together with the extracted measurement in carparison with the datum measurement to control the supply of said at least one of the ingredients to a succeeding batch.

References Cited

UNITED STATES PATENTS

| | | | |
|---|---|---|---|
| 2,100,549 | 11/1937 | McFerran | 259—10 |
| 3,006,615 | 10/1961 | Mason | 259—9 X |
| 3,249,970 | 5/1966 | Hartley. | |
| 1,334,395 | 3/1920 | Patterson | 259—11 |
| 2,689,321 | 9/1954 | Vogel. | |

FOREIGN PATENTS 867,428   5/1961   Great Britain.

WALTER A. SCHEEL, Primary Examiner

R. I. SMITH, Assistant Examiner

U.S. Cl. X.R.

107—4; 137—4